United States Patent

Zirps

Patent Number: 5,100,305
Date of Patent: Mar. 31, 1992

[54] RECIPROCATING PISTON PUMP

[75] Inventor: Wilhelm Zirps, Hemmingen, Fed. Rep. of Germany

[73] Assignee: Robert Bosch GmbH, Stuttgart, Fed. Rep. of Germany

[21] Appl. No.: 640,729

[22] Filed: Jan. 14, 1991

[30] Foreign Application Priority Data

Mar. 29, 1990 [DE] Fed. Rep. of Germany ....... 4010090

[51] Int. Cl.$^5$ .................. F04B 23/04; F04B 21/04; F04B 1/00
[52] U.S. Cl. .................. 417/521; 417/523; 417/273; 92/72; 92/129
[58] Field of Search .......... 417/521, 523, 273; 92/72, 129

[56] References Cited

U.S. PATENT DOCUMENTS 2,243,648  5/1941  Patton et al. .................. 417/521
2,680,347  6/1954  Kanuch .................. 417/523

FOREIGN PATENT DOCUMENTS 2307144  11/1976  France .
WO84/00403  2/1984  PCT Int'l Appl. .
484142  5/1938  United Kingdom .

Primary Examiner—Richard A. Bertsch
Assistant Examiner—Alfred Basichas
Attorney, Agent, or Firm—Edwin E. Greigg; Ronald E. Greigg

[57] ABSTRACT

The invention is directed to improving the performance of a reciprocating piston pump in terms of noise. The reciprocating piston pump has a drive shaft, which has a circular cylindrical swash member, which is set at an acute angle ($\beta$) to the longitudinal axis (O) of a pump and has a circumferentially disposed roller bearing ring. A pump piston, with its end face embodied as part of a spherical surface, engages the circumferential face of the roller bearing ring of the swash member. The longitudinal axes (O, P) of the drive shaft and pump piston extend in the same plane and intersect at right angles. The longitudinal axis (O, T) of the drive shaft and swash member are also offset from one another. Because of this configuration, a pumping phase that is considerably longer than the intake phase during one pumping cycle is attained. Changes in pressure and force therefore proceed more slowly in the lengthened pumping phase, which improves the noise performance of the reciprocating piston pump. The reciprocating piston pump can for instance be used in vehicle brake systems to pump brake fluid.

3 Claims, 2 Drawing Sheets

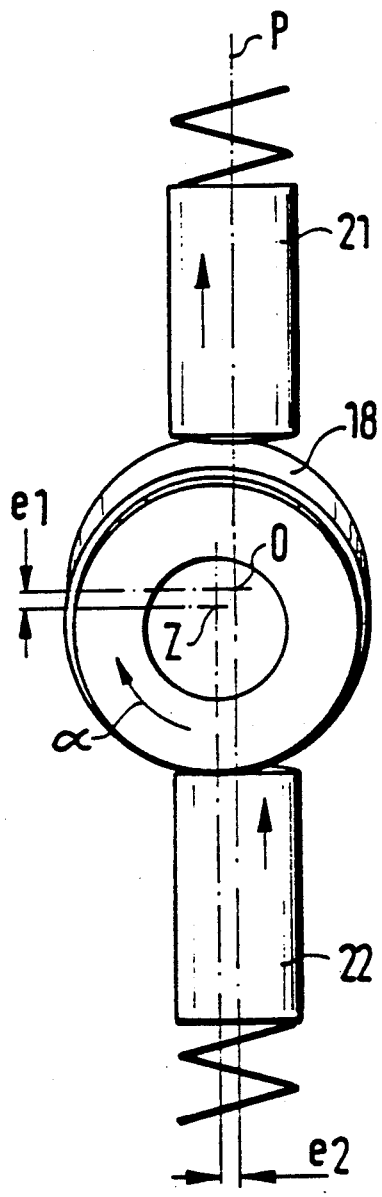
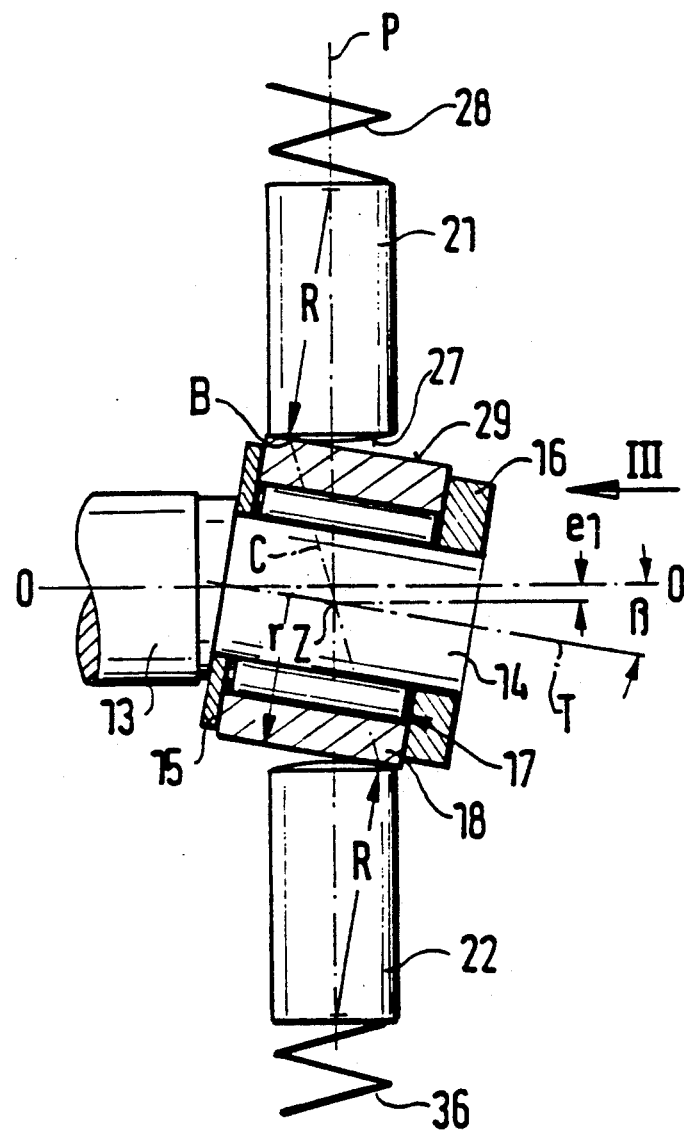

RECIPROCATING PISTON PUMP

BACKGROUND OF THE INVENTION

The invention is based on a reciprocating piston pump as defined hereinafter.

A pump of this kind is already known (British Patent 484,142), in which a roller bearing ring has a disk with an end face which is engaged by a plurality of pump pistons having a longitudinal axis that extends parallel to the longitudinal axis of a drive shaft. Such a pump is known as a swash plate pump and is classified as a reciprocating piston pump; in such a pump, the pumping flow of an individual cylinder has an approximately sinusoidal course, with an intake phase and a pumping phase of equal length. This supply flow course makes reciprocating piston pumps loud when in operation. This is due to changes in the pressure acting upon the pressure-impinged pump components and to changes in force in the pump drive train, which incite the pump housing to vibrate and make noise. Moreover, components such as valves, lines, and control motors through which the operating fluid of the pump flows also contribute to noise emissions, because of the pulsating flow of fluid. The noise level depends on the magnitude of the changes in pressure and force and on the speed with which they take place. As mentioned, pumps with only one cylinder are especially unfavorable in terms of these variables that affect loudness, because they pump only during half of one cycle, which is made up of an intake stroke and a compression stroke (that is, the intake phase and the pumping phase), and so the pumping flow varies between zero and a maximum. The speed of the change in force in the drive mechanism (drive train) and the pressure pulsation of the pumping flow are correspondingly high as well.

OBJECT AND SUMMARY OF THE INVENTION

The reciprocating piston pump according to the invention has an advantage over the prior art of considerably improved performance in terms of noise, because the intake phase of the pump cycle is shortened but the pumping phase is made longer. Accordingly, the speed of force variation in the pumping phase, in which emissions predominantly occur, is less than in the known prior art. The pump is therefore quieter than a pump of that type in which the phases are of equal length.

Further features and improvements of the reciprocating piston pump are recited herein.

With an embodiment of the reciprocating piston pump including at least two pump pistons distributed at equal intervals and extending at right angles to the longitudinal axis of a driveshaft, a lessening of noise pulsations is attained with the pump pistons disposed in this way, because the noise-producing pumping phase of one pump piston comes during the intake phase of the other pumping piston, and there is a certain overlap in the pumping phases of the two pump pistons, which have the effect of making the noise production of the pump more uniform.

With an embodiment in which the two pistons are opposite each other and pump into a common outlet, the degree of nonuniformity of the pumping flow pulsation is reduced, because of the overlapping pumping phases of the two pump pistons is reduced; in reciprocating piston pumps of a known type pumping in a sinusoidal pattern and having an even number of pump pistons, this degree of nonuniformity is relatively high in comparison with pumps having an odd number of pump pistons.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 2 is a view of the swash member and pump pistons of FIG. 1, but on a different scale;

FIG. 3 is a view of the swash member and the pump pistons in the direction of the arrow III in FIG. 2.

DESCRIPTION OF THE PREFERRED EMBODIMENT

Figure 1:
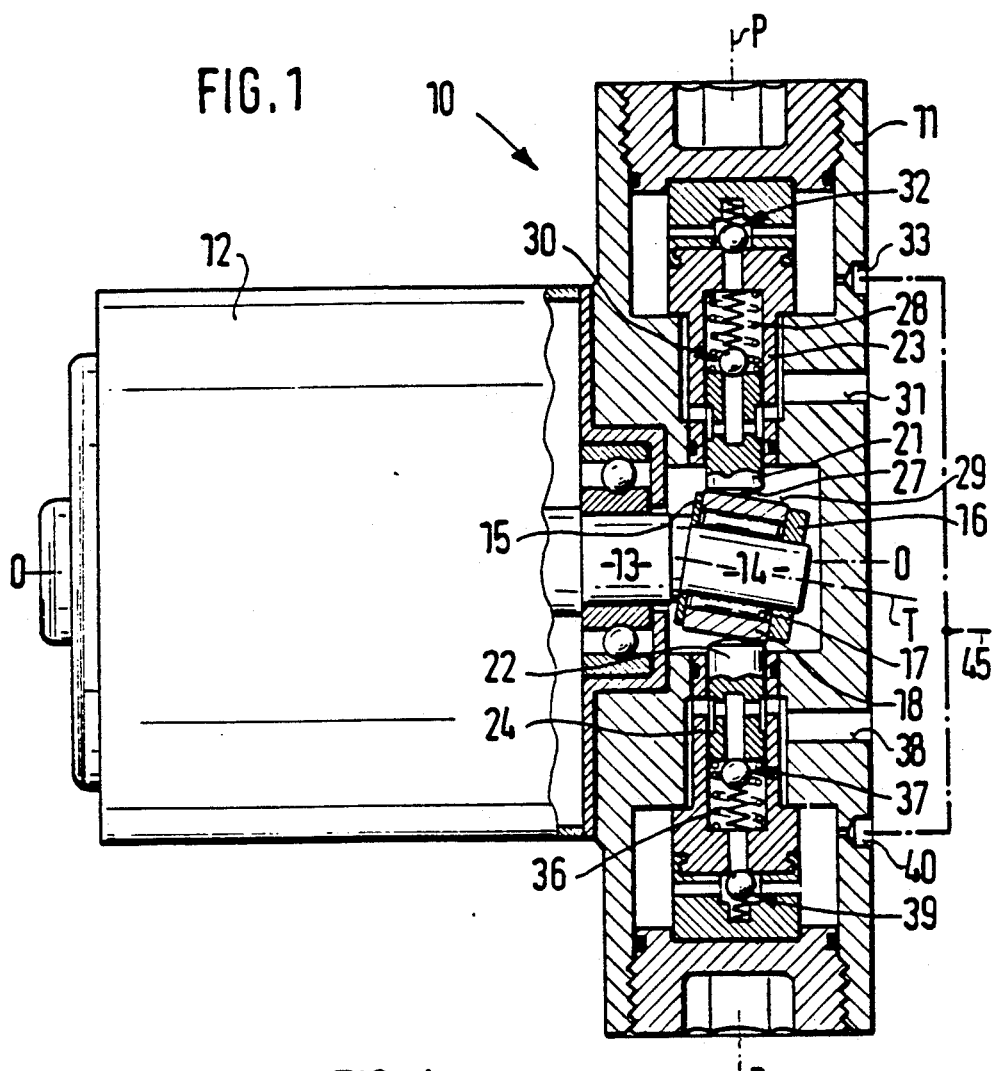
FIG. 1 is a longitudinal section through a reciprocating piston pump having a swash member for driving two pump pistons.

A reciprocating piston pump 10 shown in section in FIG. 1 has a housing 11, to which an electric drive motor 12 is flanged. The drive motor 12 has a drive shaft 13 with a longitudinal axis 0. The drive shaft 13 extends, with a circular-cylindrical swash member 14, into the housing 11 of the reciprocating piston pump 10. The swash member 14 is set at an acute angle $\beta$ of its longitudinal axis T relative to the longitudinal axis 0 of the drive shaft 13 (FIG. 2). On its circumference, the swash member 14 has needle bearings 17 disposed between two guide disks 15 and 16 and surrounded by a roller bearing ring 18 of radius r.

Two pump pistons 21 and 22 with an associated cylinder 23 and 24, respectively, are received in the housing of the reciprocating piston pump 10. The diametrically opposed pump pistons 21, 22 have a longitudinal axis P, which extends at a right angle to the longitudinal axis 0 of the drive shaft 13 and intersects it. This kind of pump structure is known as a radial piston pump.

The pump piston 21 has an end face 27, embodied as part of a spherical surface, with which it can engage the circumferential surface 29 of the roller bearing ring 18, by the action of a compression spring 28. Associated with the pump piston 21 is an inlet valve 30, which communicates with a pump inlet 31 of the housing 11. An outlet valve 32 is also provided, which communicates with a pump outlet 33 of the housing 11. Correspondingly associated with the identically embodied pump piston 22 area compression spring 36, an inlet valve 37 having an inlet 38, and an outlet valve 39 having an outlet 40 in the housing 11 of the reciprocating piston pump 10.

As FIGS. 2 and 3 show, the longitudinal axis 0 of the drive shaft 13 and the longitudinal axis P of the pump piston 21 extend in the same plane. Moreover, the angle $\beta$ by which the longitudinal axis T of the swash member 14 is set relative to the longitudinal axis 0 of the drive shaft 13 can be seen. It can also be seen that in the position shown for the swash member 14, in which its longitudinal axis T extends parallel to the plane of the longitudinal axes 0 and P, the longitudinal axis 0 of the drive shaft 13 and the longitudinal axis T of the swash member are offset from one another; that is, they do not intersect. The amount of this offset is indicated in FIGS.

2 and 3, in the position of the swash member 14 shown, by the eccentricities $e_1$ and $e_2$. The two eccentricities $e_1$ and $e_2$ refer to the spacing of a point Z on the longitudinal axis T of the swash member 14, which in the projection of FIG. 1 coincides with the longitudinal axis P of the pump pistons 21 and 22. The dimension $e_1$ indicates the eccentricity in the vertical direction and the dimension $e_2$ the eccentricity in the horizontal direction of the point Z on the longitudinal axis T of the swash member 14 with respect to the longitudinal axis 0 of the drive shaft 13. The radius R of the end face 27 of the pump piston 21 (and of the pump piston 22) is also worthy of comment; it is selected to be of such a magnitude that the point of contact B of the applicable pump piston 21 o 22 with the circumferential surface 29 of the swash member 14 is always located in the end face 27. Also shown in FIG. 3 is the rotational angle $\alpha$ of the drive shaft 13, which in the view shown is rotating clockwise. Arrows in FIG. 3 also indicate the instantaneous direction of motion that the pump pistons 21 and 22 execute in their stroke s when the drive shaft 13 is rotating.

Figure 4:
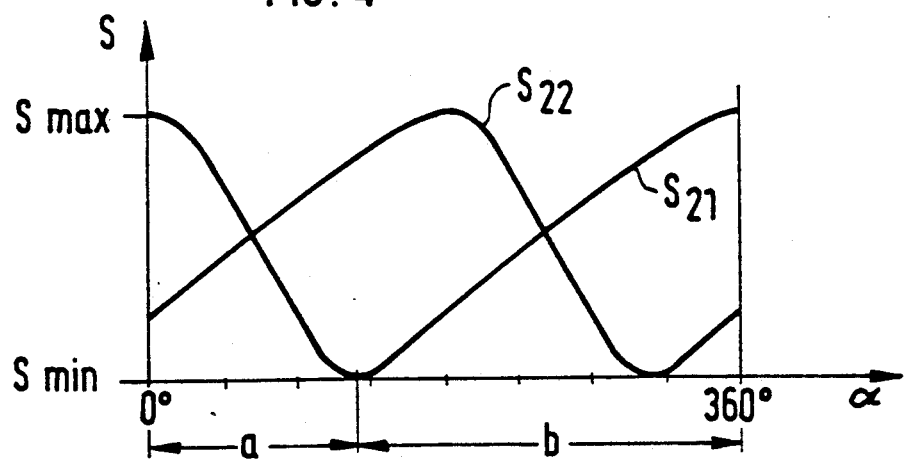
FIG. 4 is a diagram showing the course of the stroke of two pump pistons arranged diametrically opposite one another, plotted over the rotational angle of the swash member.

Because of the configuration of the swash member 14 and roller bearing ring 18 and of the pump piston 21, for example, resulting from a suitable selection of the parameters of the set angle $\beta$, radius r, eccentricity $e_1$ and $e_2$ and the radius R, a stroke course $s_{21}$ of the pump piston 21 as plotted in FIG. 4 results during one complete clockwise revolution of the drive shaft 13 (that is, clockwise from the viewpoint of FIG. 3). During this rotation of the drive shaft 13, the point of contact B of the pump piston 21 on the circumferential face 29 of the roller bearing ring 18 in fact migrates along a path C, as is shown in simplified form in FIG. 2. The piston stroke s of the pump piston 21, at a predetermined rotational angle $\alpha$, shown at 0° in the abscissa of the diagram of FIG. 4, assumes a maximum stroke position $s_{max}$. It is at this point in the diagram that the stroke course $s_{21}$ of the pump piston 21 and the intake phase of the pumping cycle begin. In the course of further clockwise rotation of the drive shaft 13, the piston stroke shortens, until after a rotational angle of approximately 135°, it attains a minimum $s_{min}$, in which the stroke course $s_{21}$ is at a tangent to the abscissa of the diagram. This concludes the intake phase a of a pump cycle, in which the pump piston 21 has moved toward the longitudinal axis 0 of the drive shaft.

Upon further rotation of the drive shaft 13, the pump piston 21 reverses its direction of motion and moves away from the longitudinal axis 0 of the drive shaft 13. This motion is completed after a rotational angle of 360° of the drive shaft 13, once the pump piston 21 attains its maximum stroke $s_{max}$. At the same time, the pumping phase b of a pumping cycle is ended. An essential feature of the invention is that the pumping phase b during one pumping cycle is markedly longer than the intake phase a, as the diagram of FIG. 4 clearly shows. The course of the volumetric flow of operating fluid pumped by the reciprocating pump 10 and expelled by the pump piston 21 approximately follows along with this stroke course $s_{21}$ of the pump piston 21 in the pumping phase b. The pump piston 22 functions analogously.

If the two pump pistons 21 and 22 are disposed diametrically opposite one another in the longitudinal axis P extending at right angles to the longitudinal axis 0 of the drive shaft 13, as is shown in FIGS. 1-3, then the stroke s of the pump piston 22 follows a course plotted in the diagram of FIG. 4 along the line $s_{22}$. This course is offset by precisely a rotational angle $\alpha$ of 180° from the stroke course $s_{21}$ of the pump piston 21. Thus, the entire intake phase of the pump piston 22 is within the pumping phase b of the pump piston 21, and vice versa. A corresponding stroke course with a 180° offset is attained for each two diametrically opposed pump pistons, if the reciprocating piston pump 10 has an even-numbered multiple of more than two pump pistons, which are disposed in a plane extending at right angles to the longitudinal axis 0 of the drive shaft 13 and passing through the point C. It is advantageous if all the pump pistons are disposed in this plane, distributed at equal intervals.

The reciprocating piston pump 10 is intended for use in a vehicle brake system (not shown), in which it pumps brake fluid. A separate pumping circuit is associated with each pump piston 21 and 22. However, the reciprocating piston pump 10 having two pump pistons 21 and 22 can also be used to pump operating fluid into a common outlet 45, as schematically suggested in FIG. 1 in dot-dash lines. As a result, the pulsating course of the pumping flow is made more uniform, because pumping of one pump piston already begins before the other has concluded its pumping phase.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A reciprocating piston pump (10) having a drive shaft (13), which has a circular cylindrical swash member (14) having a longitudinal axis (T) set at an acute angle ($\beta$) to a longitudinal axis (0) of said drive shaft (13) and having a circumferentially disposed roller bearing ring (18), which is in engagement with an end face (27), embodied as part of a spherical surface, of at least one pump piston (21) having a longitudinal axis (P), wherein the longitudinal axis (0) of the drive shaft (13) and the longitudinal axis (P) of the pump piston (21) extend in the same plane:

the pump piston (21) engages a circumferential face (29) of the roller bearing ring (18);

the longitudinal axis (0) of the drive shaft (13) and the longitudinal axis (P) of the pump piston (21) intersect one another at right angles; and the longitudinal axis (0) of the drive shaft (13) and the longitudinal axis (T) of the swash member (14) are offset from one another.

2. A reciprocating piston pump as defined by claim 1, in which at least two pump pistons (21, 22) are uniformly spaced about the circumference of said roller bearing ring (18) and their axles (P) are in one plane extending at right angles to the longitudinal axis (0) of the drive shaft (13).

3. A reciprocating piston pump as defined by claim 2, in which at least two diametrically opposed pump pistons (21) pump into a common outlet (45).

* * * * *